United States Patent [19]
Treharne et al.

[11] 3,722,283
[45] Mar. 27, 1973

[54] LINEAR READING THERMOMETER

[75] Inventors: Richard W. Treharne; James A. Riley; Eddie R. Thomas, Yellow Springs, Ohio

[73] Assignee: Kettering Scientific Research Inc., Dayton, Ohio

[22] Filed: Nov. 17, 1971

[21] Appl. No.: 199,479

Related U.S. Application Data

[63] Continuation-in-part of Ser. No. 29,197, April 16, 1970, abandoned.

[52] U.S. Cl. ..........73/362 SC, 73/362 AR, 307/310, 323/75 F, 323/75 H
[51] Int. Cl. ..............................................G01k 7/22
[58] Field of Search ....73/362 AR, 362 SC; 307/310; 323/75 F, 75 H, 75 N

[56] References Cited

UNITED STATES PATENTS

| | | | |
|---|---|---|---|
| 3,568,044 | 3/1971 | Elazar | 323/75 N |
| 2,271,975 | 2/1942 | Hall | 73/362 AR UX |
| 2,764,731 | 9/1956 | Koerner | 73/362 AR X |
| 2,938,385 | 5/1960 | Mack et al. | 73/362 AR |
| 2,971,379 | 2/1961 | Weisheit | 73/362 AR |
| 3,036,464 | 5/1962 | Beeston | 73/362 AR X |
| 3,092,998 | 6/1963 | Barton | 73/362 SC |
| 3,420,104 | 1/1969 | Troemel et al. | 73/362 SC |
| 2,653,308 | 9/1953 | Allen | 73/362 AR X |
| 3,440,883 | 4/1969 | Lightner | 73/362 SC |

*Primary Examiner*—Louis R. Prince
*Assistant Examiner*—Frederick Shoon
*Attorney*—Lawrence B. Biebel et al.

[57] ABSTRACT

A silicon diode is used in a bridge circuit designed to provide linear changes in current through a meter in the bridge in response to changes in temperature on the diode. Variations from linear response in individual diode resistance characteristics as a function of temperature are compensated by a resistor in series with the diode and a second resistor in parallel with the diode, with these resistors being selected so that the resistance versus temperature characteristic of the entire circuit is fixed, thereby providing linear response and allowing interchangeability of diode temperature measuring circuits with a single bridge. All legs of the bridge circuit include resistances of the same order of magnitude to provide maximum sensitivity of the bridge to temperature measurements. In one embodiment one leg of the bridge is provided with a plurality of resistors, one of which is connected at a time in the bridge circuit to maintain the bridge near a balance condition through the entire temperature range of the instrument. In another embodiment, fixed resistors are used in each leg with readout being provided by a digital volt meter.

9 Claims, 10 Drawing Figures

INVENTORS
RICHARD W. TREHARNE,
JAMES A. RILEY &
EDDIE R. THOMAS
BY Mareschal, Biebel, French & Bugg
ATTORNEYS

LINEAR READING THERMOMETER

RELATED APPLICATION

This application is a continuation-in-part of copending application Ser. No. 29,197, filed Apr. 16, 1970, and now abandoned.

BACKGROUND OF THE INVENTION

A semi-conductor diode will exhibit a change in resistance which is inversely proportional to a change in the temperature to which the diode is subjected. This change in resistance to temperature is nonlinear, and it is therefore necessary to employ special techniques if a linear change in electrical quantity, either voltage or current, with respect to a change in the diode temperature is desired.

One technique for obtaining a linear electrical output is shown in U.S. Pat. No. 3,092,998 where a germanium diode is included in one leg of a bridge circuit and wherein the current through the diode is maintained at a substantially constant magnitude by including a relatively high resistance in another leg of the bridge. Since the resistance values in the legs of the bridge differ by at least an order of magnitude, maximum sensitivity of the bridge over wide temperature ranges is not obtained. Moreover, no means for compensating for individual diode characteristics to provide interchangeable sensors is described.

Another technique, shown in U.S. Pat. No. 3,330,158, uses a matched bridge circuit wherein each of the legs of the bridge is composed of a similar diode, each having substantially identical temperatures versus voltage characteristics, with two of the diagonally opposite diodes being positioned in the environment the temperature of which is to be measured. There is no provision, however, for compensating the bridge for a wide variation in diode resistance as the temperature of the diode changes, and again maximum sensitivity is not obtained.

Thermistors have also been used as temperature responsive devices, examples of which are shown in the following U.S. Pat. Nos. 2,271,975; 2,764,731; 2,971,379; 2,938,385 and 3,036,464. A thermistor, however, does not react to changes in temperature in the same manner as a diode. Therefore, the techniques used to linearize the output of thermistor type temperature sensors are not the same as those used in the present invention to linearize the output of the diode. A diode is characterized by a nonlinear voltage-current relationship at a constant temperature while a thermistor possesses a linear or ohm's law voltage-current relationship at a constant temperature. In the present invention, the unique characteristics of a diode with changes in temperature are used to produce a linear reading thermometer which may read temperatures over an extremely wide range, as from −200° to +200°C.

SUMMARY OF THE INVENTION

This invention relates to an improved linear reading electronic thermometer and more particularly to a linear reading thermometer employing a single semiconductor diode, preferably a silicon diode, in one leg of a bridge circuit, all of the legs of which are of the same order of magnitude as the resistance of the diode at the temperature to which it is subjected.

A constant voltage source is connected across diagonally opposed terminals of a bridge circuit having legs of approximately equal resistance with a meter being connected to the remaining diagonally opposed terminals to measure the current flow in the bridge circuit. The diode temperature measuring element is connected as the resistance in one leg of the bridge circuit and in one embodiment, a plurality of resistors, one of which is selected by a switch, are found in another leg of the bridge circuit so that the temperature range to which the diode may be subjected may be expanded and displayed at maximum sensitivity on the meter scale.

The invention also contemplates the use of interchangeable diode units with a single instrument. Interchangeability as well as linearity is provided by including in the diode circuit a pair of resistors, one of which is in series with the diode and the other of which is in parallel with the diode. The resistance values of these resistors are so selected that the entire circuit will obtain predetermined resistance values for specified temperatures.

In the preferred embodiments of the present invention, the current through the diode is allowed to vary by as much as fifty percent with changes in temperature, and due to the voltage-current characteristic of a diode, a linearized output may be obtained. This is not true of any of the prior art devices, particularly U.S. Pat. No. 3,092,998 where the current through a germanium diode is held at a nearly constant value. This is done by unbalancing the bridge circuit in which the diode is connected, and therefore linearity and maximum sensitivity are not obtained.

The nonlinearity in the resistance versus temperature response of the diode used in this invention is partially compensated by the characteristics of a substantially balanced bridge circuit with final linearization being accomplished by means of series and shunt resistors so that a linear change in bridge current results from linear changes in diode temperature. By providing a matched bridge circuit, that is a circuit wherein each leg contains resistances of approximately equal value, maximum sensitivity to temperature changes is obtained. Accuracy in the order of ±½°C is consistently obtainable over a temperature range of at least −200° to +200°C.

Accordingly, it is an object of this invention to provide an improved linear reading electronic thermometer employing a diode temperature sensing element as one resistance in a bridge circuit including resistances of approximately equal value; to provide an improved linear reading thermometer of the type described wherein the diode temperature sensing element is corrected for individual variations in diode resistance so that the sensors can be interchangeable with several instruments, or wherein the instrument may accept several different diode elements; and to provide a linear reading thermometer using a silicon diode and a digital readout device.

Other objects and advantages of the invention will be apparent from the following description, the accompanying drawings and the appended claims.

DESCRIPTION OF THE PREFERRED EMBODIMENT

Figure 1:
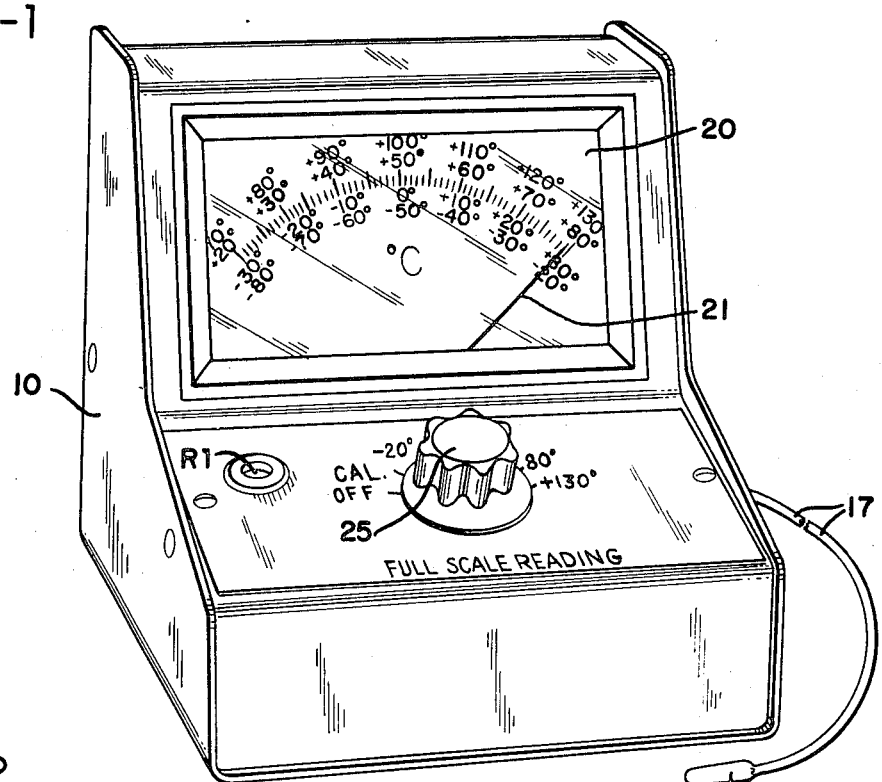
FIG. 1 is a perspective view of an electronic thermometer employing the diode element and bridge circuit of this invention.
Figure 2:
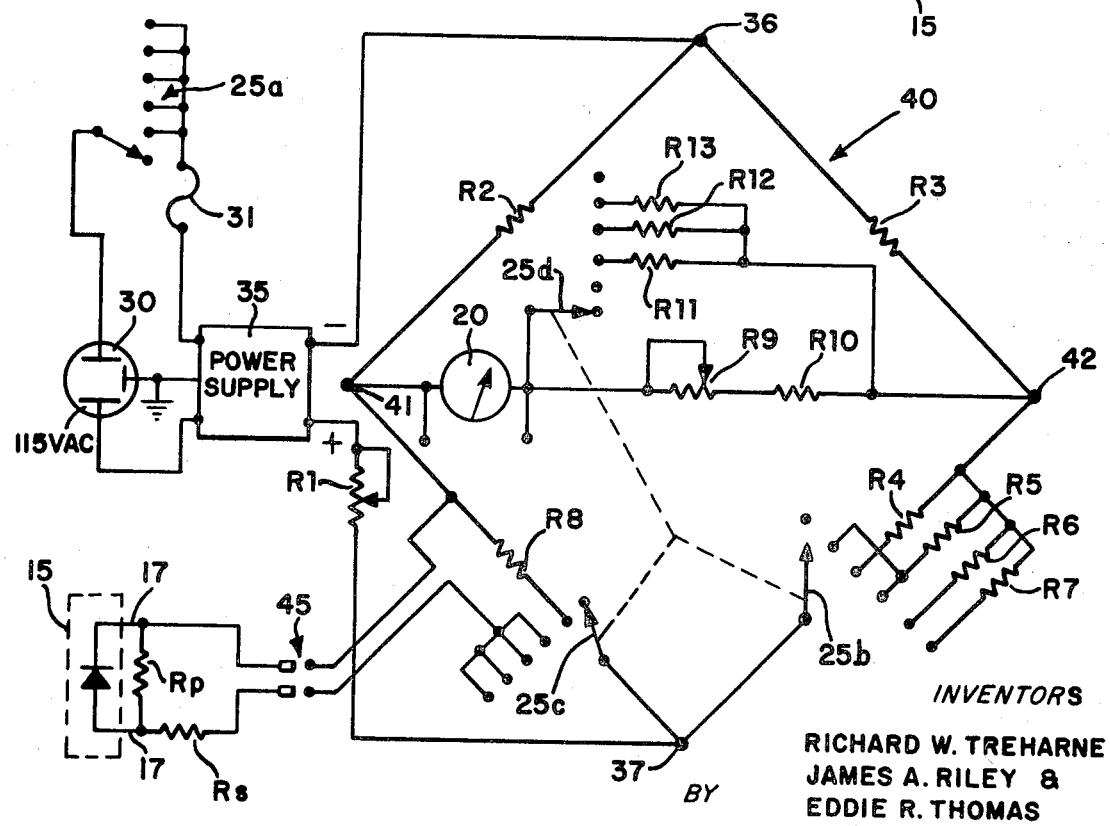
FIG. 2 is an electrical schematic diagram showing a bridge circuit designed according to the principles of this invention.

Referring now to the drawings which illustrate preferred embodiments of the invention, and particularly to FIGS. 1 and 2 which show one embodiment, a linear reading thermometer includes a cabinet 10, shown in FIG. 1, and contained within the cabinet is an electronic circuit to which the diode temperature measuring device 15 is connected by means of a cable 17. A General Electric type 1N4536 silicon diode is used in a preferred embodiment. The temperature of the diode 15 is displayed for view on a meter 20 mounted in the cabinet 10. A meter pointer 21 may be viewed against a meter face including several scales, each overlapping slightly, and each calibrated in degrees centigrade. The divisions on the scale are linearly spaced since the current through the meter will change in a linear relation to a change in temperature of the diode 15.

The temperature range, and therefore the scale to be read, is selected by a selector switch 25 mounted on a generally horizontal portion of the cabinet 10. This selector switch, as will be explained, includes four decks or switch elements to select appropriate resistances for the bridge circuit. The selector switch includes an off position which disconnects the instrument from an external source of power, a calibrating position which is used to calibrate the instrument prior to use, and four temperature ranges. The maximum temperature in each range is printed adjacent the switch. In the calibrating position, the needle 21 of the meter is positioned to a predetermined calibrating mark by adjusting a calibrating potentiometer R1 which is provided with a screwdriver slot since only infrequent calibration of the instrument is required.

Referring now to the electrical schematic diagram in FIG. 2, the instrument is connected to a source of 115 volt A.C. power by a plug 30. One terminal of this plug is connected through deck 25a of selector switch 25. In the first position of the switch, the instrument is disconnected from the source of power, however in the remaining five positions of the switch, the power source is connected through fuse 31 to a constant voltage power supply 25. An Even Volt, Model 402-21, power supply has been found useful for this purpose. The output of this power supply, which is 1.345 volt D.C. at four milliamps, is applied to diagonally opposed terminals 36 and 37 of a bridge circuit shown generally at 40. The calibrating potentiometer R1 is connected in series with one of the output terminals of the power supply 35 and terminal 37.

The bridge circuit 40 includes four legs each having approximately equal resistance. The two upper legs include resistors R2 and R3. One of the two lower legs, shown to the right in FIG. 2, includes resistors R4 through R7, one of which is selected by deck 25b of the selector switch 25.

The other lower leg, shown at the left, includes either resistor R8, or the diode temperature measuring device 15, according to the position of deck 25c of the selector switch. The selector switch 25 is shown in the off position, and when moved to the calibrating or second position, resistor R8 will be connected in the bridge circuit. In the remaining positions of the selector switch, the diode temperature measuring device 15 will be connected in the circuit.

The meter 20 for measuring the current in the bridge circuit is connected to the remaining diagonally opposed terminals 41 and 42 of the bridge circuit. In the preferred embodiment, meter 20 is a twenty microampere movement and is connected in series with an adjusting potentiometer R9 and a fixed resistor R10. Connected in parallel with resistors R9 and R10 are resistors R11, R12 and R13, one of which is selected by deck 25d of the selector switch.

In order to match the characteristics of a silicon diode to the to circuit to provide linear response at the bridge output, it has been found necessary to include series and parallel resistors, since individual diodes may vary in their resistance at a given temperature. It has also been found desirable to provide an instrument wherein a plurality of diode temperature measuring devices can be interchangeably connected to the instrument where, for example, one such device becomes damaged or where a plurality of temperature measurements are to be made utilizing a single display instrument. To assist in providing linear response to compensate for individual diode characteristics, a series resistor Rs and a parallel resistor Rp are included in a plug in assembly with the diode 15. Thus, the diode 15 and resistors Rs and Rp are contained within a separate assembly which may be connected to the bridge circuit 40 by means of a plug 45.

The following table provides the resistance and tolerance values of the resistors used in the embodiments of FIG. 2:

TABLE I

| | |
|---|---|
| R1 | 150 ohm — adjustable |
| R2 | 1000 ohm — 0.1% |
| R3 | 1000 ohm — 0.1% |
| R4 | 1147 ohm — 0.1% |
| R5 | 956 ohm — 0.1% |
| R6 | 789 ohm — 0.1% |
| R7 | 640 ohm — 0.1% |
| R8 | 800 ohm — 10% |

| | |
|---|---|
| R9 | 200 ohm — adjustable |
| R10 | 1793 ohm — 1% |
| R11 | 5172 ohm — 1% |
| R12 | 5037 ohm — 1% |
| R13 | 16190 ohm — 1% |
| Rs | 22–25 ohm — approximate |
| Rp | 2400–3650 ohm — approximate. |

Figure 3:
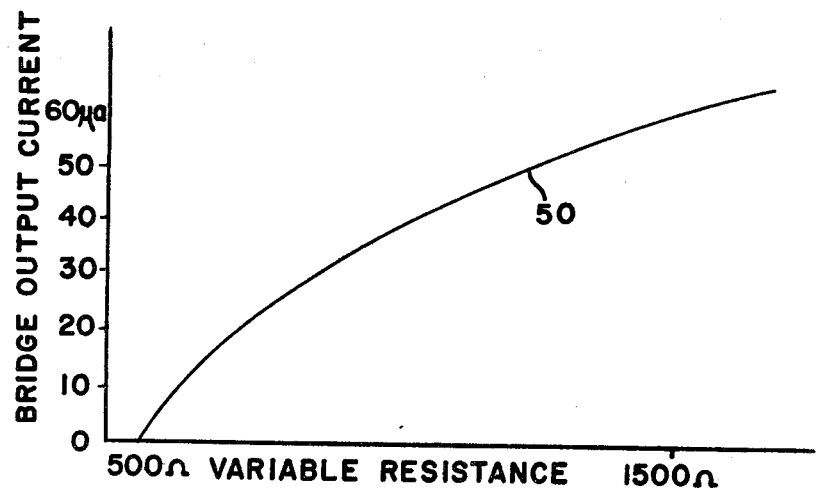
FIG. 3 is a curve showing the relationship of the bridge output current to changes in the resistance of one leg of the bridge.
Figure 4:
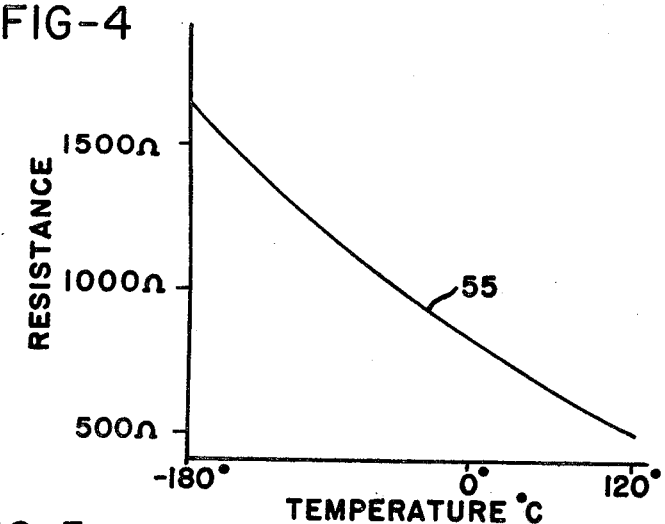
FIG. 4 is a curve showing resistance of the temperature measuring diode as a function of temperature.
Figure 5:
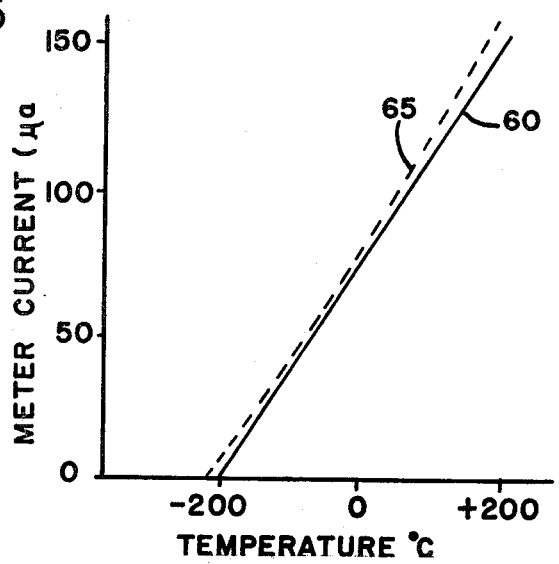
FIG. 5 is a curve showing the current through the meter of FIG. 2 as a function of the temperature of the diode.
Figure 8:
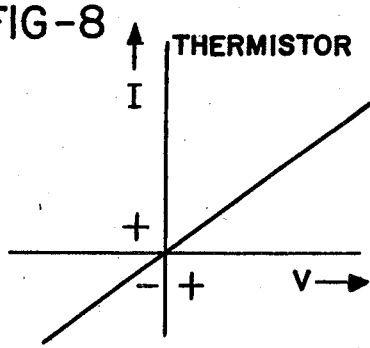
FIG. 8 is a curve showing the linear or ohm's law current-voltage relationship of a thermistor.
Figure 9:
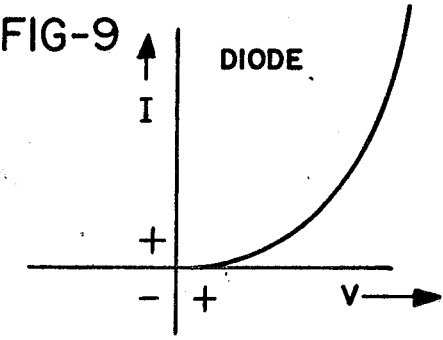
FIG. 9 is a curve showing the nonlinear current-voltage relationship of a diode.
Figure 10:
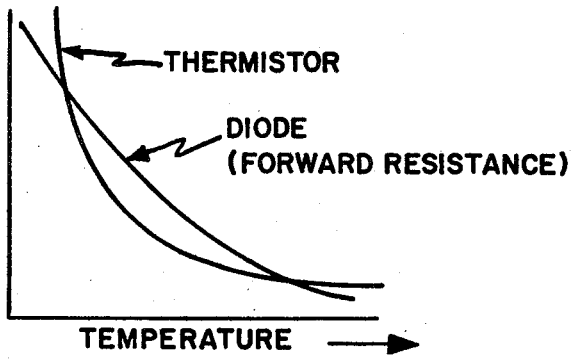
FIG. 10 includes a pair of curves showing the resistance-temperature relationship of both thermistors and diodes.

Each leg of the bridge circuit includes resistances of approximately the same order of magnitude, about 1000 ohms. In FIG. 3, a typical relationship between the current through the meter 20 and the resistance of one of the legs of the bridge is shown by curve 50. This relationship is nonlinear. In FIG. 4, a typical resistance curve of diode 15 with respect to temperature is shown by the curve 55. This is also a nonlinear relation. FIGS. 8 and 9 show the current-voltage relationship of thermistors and diodes, respectively. The thermistor possesses a linear or ohm's law current-voltage relationship at constant temperature while a diode is characterized by a nonlinear current-voltage relationship. These curves illustrate one important distinguishing characteristic between diodes and thermistors. FIG. 10 clearly shows the differences between the resistance-temperature relationship of thermistors and diodes as a second distinguishing characteristic. In the present invention, by careful selection of the bridge response curve as related to the resistance-temperature curve of the diode 15, it is possible to make use of the unique characteristics of a diode and obtain a device wherein the current through the meter 20 varies as a nearly linear function of temperature, as shown by the curve 65 in FIG. 5. Resistors Rs and Rp are used to provide final linearization as shown by curve 60.

Since the diode 15 varies in resistance inversely to temperature, the value of the resistance in the opposite leg of the bridge is also varied to balance the bridge substantially, thus operating the bridge at its maximum sensitivity throughout the temperature range for which the instrument is designed. Thus for the lowest temperature range, resistor R4 is 1147 ohms which is the resistance of the diode assembly, including resistors Rs and Rp, at −80°C. Similarly, resistances R5, R6 and R7 approximately equal the resistance of the diode assembly at −30°C, +20°C and +70°C, respectively.

Referring again to FIG. 5, the curve 65 shown in dashed lines represents the response of the instrument to changes in temperature of a diode which is connected to the circuit without the compensating resistors Rs and Rp. It will be seen that this curve is slightly nonlinear and displaced from curve 60. The amount of nonlinearity and displacement will vary from diode to diode due to individual resistance characteristics, and in order to make the probe assembly linear and interchangeable, the compensating resistors Rs and Rp are carefully selected to bring the response curve of the instrument in line with the curve 60.

Resistors Rs and Rp are selected in the following manner. The diode 15 is first subjected to a temperature of 100°C (boiling water) and the series resistor Rs initially adjusted to provide a 100° reading on the meter 20. The diode is then cooled to 0°C (ice and water mixture) and the parallel resistor Rp is adjusted to give a 0° reading on the meter 20. This procedure is repeated several times since there is an interaction between resistors Rs and Rp. Finally, the probe is subjected to a −195.8°C temperature (liquid nitrogen), and then to +180°C (a calibrated oven) and the meter readings checked. Only the diode 15 is subject to the temperature to be measured since the resistors Rs and Rp are mounted near the plug 45 which attaches to a receptacle in the back of the instrument housing.

Figure 6:
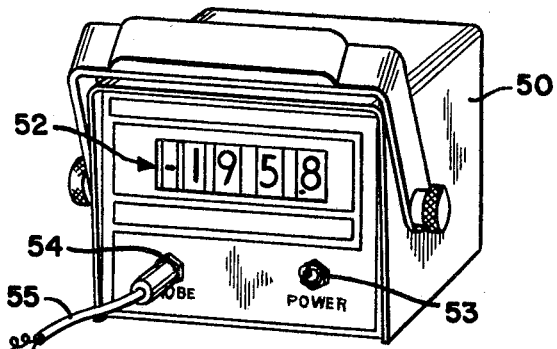
FIG. 6 is a perspective view of another embodiment of the invention employing a digital readout.
Figure 7:
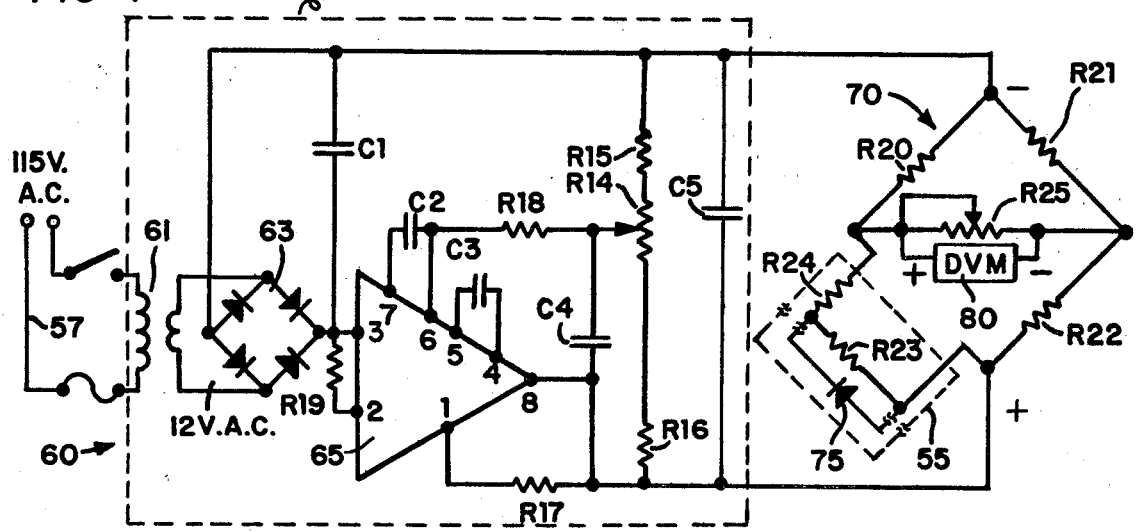
FIG. 7 is an electrical schematic diagram showing a bridge circuit for use with a digital readout device.

Reference is now made to FIGS. 6 and 7 which show another embodiment of the invention wherein a digital readout device is used to display the temperature of the diode. In this embodiment, the thermometer includes a cabinet 50 having a digital readout device 52 to display clearly the temperature in degrees centigrade. On the front of the cabinet, and available to the operator, is an on-off switch 53 and a receptacle 54 which receives a plug in cable 55, one end of which is attached to a temperature sensing probe.

In this embodiment, no range switch is necessary since the digital readout device will display the temperature throughout the entire range (−200° to +200° C) of the instrument.

Referring now to FIG. 7, the instrument is connected to a source of power by an electrical cable 57. A power supply, shown generally at 60, includes a power transformer 61, which, in the preferred embodiment is a Stancor Model T-A361 transformer. The secondary winding of this transformer is connected to a full wave diode bridge rectifier 63. The 12 volt AC output of the bridge rectifier 63 is applied to a filter capacitor C1 and to an integrated circuit voltage regulator 65. The voltage regulator shown herein is an RCA type CA3055 silicon monolithic integrated circuit device. The resistors and capacitors associated with the voltage regulator are selected to give the voltage output of the power supply of from 1.8 to 2.5 volts D.C., with the actual voltage being determined by potentiometer R14.

The output of the power supply circuit 60 is applied across a bridge circuit 70. Since diodes, unlike thermistors, are polarity sensitive, the polarity of the voltage applied to the bridge must be as indicated for proper operation of the diode. The diode must be forward biased and the bipolar meter polarity also must be as shown. The bridge circuit has four legs, each with approximately equal resistances. The two upper legs includes resistors R20 and R21. One of the two lower legs, shown at the right in FIG. 7, includes resistor R22. The remaining legs includes the diode sensing device 75 and two calibrating and linearizing resistors R23 and R24.

A digital volt meter 80 is connected in parallel with an adjustable resistor R25 across the bridge 70. The digital volt meter may be a Weston Model 1292 bipolar, digital volt meter with a range of ±200 millivolts. The bridge is so designed that a change of one degree centigrade at the probe 75 is represented by a change of one millivolt across the meter terminals of the bridge.

The diode 75 is located at the end of the cable 55 while resistors R23 and R24 are located at the instrument end of the cable immediately adjacent to the connection or receptacle 54 on the instrument housing. Therefore, only the diode 75 is subjected to the temperatures to be measured.

The value of resistors R22, R23, R24 and R25 are determined by experiment in the following manner. R22 and R25 are set to approximately 1000 ohms each. Diode 75 is connected to the bridge without R23 and R24. The power supply 60 is adjusted so that it supplies an output of 2.4 volts. Liquid nitrogen at −195.8°C, an ice bath at 0°C, and boiling water at +100°C are used as the three primary calibration points.

The diode probe 75 is placed into an ice bath and resistor R22 is adjusted until the digital volt meter reads 0°C. The diode 75 is then removed from the ice bath and inserted into liquid nitrogen. Resistor R25 is then adjusted until the digital volt meter reads −200°C. Diode 75 is then inserted into boiling water and the reading on the digital volt meter observed. This reading, for the time being, should be +105°C, ±3°C. If it is not within this range, then the steps outlined above are repeated.

Resistors R23 and R24 are then installed with R24 being adjusted initially to a zero ohm value and R23 adjusted to approximately 5000 ohms. Diode 75 is placed again into liquid nitrogen and R23 adjusted until the digital volt meter reads −196°C, ±1°C. The diode 75 is then placed in boiling water and R24 adjusted until the digital volt meter reads from 99 to 101°C. The diode is then placed in an ice bath at 0°C and the reading on the digital volt meter checked. All of the above steps are repeated adjusting R23 finally for a −195.8°C reading when the probe is in liquid nitrogen and adjusting R24 for a +100°C, ±0.5°C reading when the probe is in boiling water.

The following table provides the resistances and capacitances of the components identified in FIG. 7.

TABLE II

| C1 | 5000 μfd, 25V | R19 | 22 ohms |
|---|---|---|---|
| C2 | 20 pf | R20 | 1 K ohms |
| C3 | 2 μfd | R21 | 1 K ohms |
| C4 | 2 μfd | R22* | approximately 643 ohms |
| C5 | 5 μfd, 50V | R23* | approximately 2500 ohms |
| R14 | 5 K ohms | R24* | approximately 45 ohms |
| R15 | 1 K ohms | R25* | 10 K ohms potentiometer |
| R16 | 2700 ohms | | * = adjusted according to the above instructions |
| R17 | 5.6 ohms | | |
| R18 | 1 K ohms | | |

In the embodiment of the invention shown in FIGS. 6 and 7, the current flow across the diagonally opposed terminals of the bridge circuit is detected by volt meter 80 connected in parallel with resistor R25. This differs slightly from the embodiment of FIGS. 1 and 2 where the meter 20 measures current directly. The bridge 70 is adjusted to be in balance when the diode 75 is exposed to 0°C, and therefore no current flows through resistor R25. This means that resistor R22 will have the same resistance as the probe, including diode 75 and resistors R23 and R24 when the diode is exposed to 0°C. For each change in temperature of the diode of 1°C, the current through R25 will cause the voltage thereacross to change by one millivolt.

The instruments thus described provide a linear response in bridge current to changes in temperature on a silicon diode and, since the bridge includes nearly balanced legs, maximum sensitivity over the desired temperature range is achieved.

Instruments constructed according to the teachings of this invention are found to be accurate within ±½°C over the entire operating range (−200°C to +200°C) of the instrument described herein.

While the forms of apparatus herein described constitute preferred embodiments of the invention, it is to be understood that the invention is not limited to these precise forms of apparatus, and that changes may be made therein without departing from the scope of the invention as defined in the appended claims.

What is claimed is:

1. A linear reading electronic thermometer including a constant voltage source;
   a bridge circuit including four legs each having approximately equal resistances, said bridge circuit having diagonally opposed terminals connected to said voltage source;
   means for measuring and displaying the current in said bridge circuit, said means connected to the remaining diagonally opposed terminals of said bridge circuit; and
   a diode temperature measuring device connected as the resistance in one leg of said bridge, said device including a silicon diode, the resistance of which varies inversely as a function of temperature, a first resistor connected in parallel with said diode and a second resistor connected in series with said parallel connection, the resistance of said first and second resistors being adjusted to compensate for the individual characteristics of said diode so that the diode temperature measuring device has a temperature-resistance characteristic which compensates for the nonlinear characteristics of said bridge circuit thereby causing current through said measuring and displaying means to vary linearly with variations in the temperature to which said diode is exposed.

2. The electronic thermometer of claim 1 wherein said diode measuring device is removably connected in said bridge circuit and wherein said first and second resistors compensate for variations and nonlinearity in the individual resistance characteristics of said diode thus allowing interchangeability of diode measuring devices with said bridge circuit.

3. The electronic thermometer of claim 1 further including a calibrating resistor connected between said constant voltage source and said bridge circuit.

4. The electronic thermometer of claim 1 wherein one of the legs of said bridge circuit includes a plurality of resistors, one resistor being connected in said bridge circuit at a time to balance said bridge circuit substantially thus to enable a linear change in current through said measuring and display means as temperatures are measured by said diode over a wide range.

5. The electronic thermometer of claim 4 wherein the resistance of each of said plurality of resistors equals the resistance of said diode temperature measuring device at the lowest temperature of said diode in a predetermined range of temperatures.

6. The electronic thermometer of claim 1 further including a plurality of resistors connected in series with said measuring and display means, said resistors being selected in accordance with the range of temperature being measured to compensate for minor changes in current through said measuring and display means for various temperature ranges.

7. The thermometer of claim 1 wherein said measuring and display means includes a meter connected across said remaining diagonally opposed terminals to measure the output current in said bridge circuit.

8. The thermometer of claim 1 wherein said measuring and displaying means includes a resistor connected across said remaining diagonally opposed terminals and a digital volt meter for displaying the voltage across said resistor as a function of the temperature of said diode.

9. The thermometer of claim 1 wherein said bridge circuit is in balance when said diode is sensing a temperature of 0°C.

* * * * *